(12) United States Patent
Crocker

(10) Patent No.: US 12,511,836 B2
(45) Date of Patent: Dec. 30, 2025

(54) OBJECT SHELLING AND HOLLOWING

(71) Applicant: IntegrityWare, Inc, Lake Havasu City, AZ (US)

(72) Inventor: Gary Arnold Crocker, San Diego, CA (US)

(73) Assignee: IntegrityWare, Inc., San Diego, CA (US)

( * ) Notice: Subject to any disclaimer, the term of this patent is extended or adjusted under 35 U.S.C. 154(b) by 448 days.

(21) Appl. No.: 17/946,678

(22) Filed: Sep. 16, 2022

(65) Prior Publication Data

US 2024/0096021 A1 Mar. 21, 2024

(51) Int. Cl.
*G06T 17/20* (2006.01)
*G06T 5/70* (2024.01)

(52) U.S. Cl.
CPC .............. *G06T 17/205* (2013.01); *G06T 5/70* (2024.01)

(58) Field of Classification Search
CPC .......... G06F 30/12; G06F 30/00; G06F 30/17; G06T 17/205; G06T 2219/2021; G06T 17/10; G06T 5/70
See application file for complete search history.

(56) References Cited

U.S. PATENT DOCUMENTS

| | | | | |
|---|---|---|---|---|
| 7,643,026 B2* | 1/2010 | Chai | ....................... | G06T 17/30 345/442 |
| 10,325,418 B1* | 6/2019 | Pirzanski | ................... | G06T 5/70 |
| 10,635,088 B1* | 4/2020 | Bandara | .............. | G05B 19/4099 |
| 2012/0206457 A1* | 8/2012 | Crocker | ............... | G06V 40/165 345/420 |
| 2013/0293541 A1* | 11/2013 | Maisonneuve | ....... | G06T 17/205 345/420 |
| 2015/0066179 A1* | 3/2015 | Stava | .................... | B29C 64/386 700/98 |
| 2015/0331968 A1* | 11/2015 | Crocker | .................. | G06T 17/10 703/1 |
| 2018/0173826 A1* | 6/2018 | White | ...................... | G06F 30/00 |
| 2021/0045701 A1* | 2/2021 | Unklesbay | ........... | A61B 5/0077 |
| 2021/0181714 A1* | 6/2021 | Gurdiel Gonzalez | .. | B22F 12/82 |

OTHER PUBLICATIONS

Youtube—The Vase—The Machine Bros Solutions (How to hollow out STL models with Meshmixer), URL: https://www.youtube.com/watch?v=x_fvyYhUPcl (Year: 2021).*
Youtube—Kayla Pruyssers (solid vs hollow & combine vs the 3 booleans), URL: https://www.youtube.com/watch?v=7tqy-PJq6Ds&t=446s (Year: 2016).*

* cited by examiner

*Primary Examiner* — Phuc N Doan

(57) ABSTRACT

A method of producing data representing a modified object based on data representing a reference object is disclosed. The method includes generating one or more offset surfaces based on the data representing the object, where one or more offset surfaces are offset from surfaces of the reference object, and where at least one of: the one or more offset surfaces defines an open surface, and the one or more offset surfaces defines a region having a surface to surface distance which is than a minimum thickness, generating an offset object including at least one of adding and removing one or more portions of at least one of the offset surfaces, where, at least partly because of the adding or removing of the one or more portions, the offset object both does not define an open surface and does not have a region thinner than the minimum thickness limit.

21 Claims, 6 Drawing Sheets

OBJECT SHELLING AND HOLLOWING

TECHNICAL FIELD

The described technology relates to systems and methods of manipulating graphical information representing a polygonal data object, and more particularly to shelling or hollowing a reference object with problematic geometries.

BACKGROUND

Polygonal model data is created with, for example, a 3-D CAD software tool by, for example, a designer. The polygonal model or polygonal mesh includes discrete data points describing one or more surfaces or objects. Polygonal models are convenient for design work at least because they define the surface or object with a degree of detail convenient for the designer to work with. The shape of the surface or object is defined by the data points, and the surface between the data points is perceived, but is not necessarily specifically represented in the data. This allows for the CAD system to function quicker because of a significantly reduced data set representing the surface or object, while providing the designer enough detail to manipulate to achieve a desired design.

The polygonal data may be edited by a designer according to the designer's purposes. For example, the designer may add features to the object represented by the polygonal data using mesh operations. In addition, to create smooth, natural looking objects, a smoothing algorithm may be used to modify the polygonal data. For example, a Catmull-Clark algorithm or a Loop subdivision algorithm may be performed on the polygonal data. The smoothing algorithm modifies the polygonal data by, for example, adding vertices and repositioning existing vertices. Thus, the smoothing algorithm generates a modified object.

A shelled or hollowed version of a reference object, for example, a solid reference object, is frequently generated. Because automatically generating surfaces offset from the reference object generates problematic geometries, automatic shelling or hollowing cannot generally be performed on arbitrary reference objects.

SUMMARY

One inventive aspect is a method of producing data representing a modified object based on data representing a reference object. The method includes accessing the data representing the reference object with a computer, receiving an indication from a user to generate the modified object, and in response to the indication: generating a set of one or more offset surfaces based on the data representing the object, where one or more offset surfaces are offset from surfaces of the reference object, and where at least one of: the set of one or more offset surfaces defines an open surface, and the set of one or more offset surfaces defines a region having a surface to surface distance which is than a minimum thickness limit, generating an offset object, where generating the offset object includes at least one of adding and removing one or more portions of at least one of the offset surfaces, where, at least partly because of the at least one of adding and removing of the one or more portions, the offset object both does not define an open surface and does not have a region thinner than the minimum thickness limit, and generating the data representing the modified object, where generating the data representing the modified object includes performing a subtraction operation on the reference object and the offset object.

In some embodiments, the reference object defines a closed surface.

In some embodiments, the modified object is hollow.

In some embodiments, the modified object is represented by a non-uniform rational basis line (NURBS) representation.

In some embodiments, generating the offset object includes extruding a surface of the reference object.

In some embodiments, the modified object includes an opening in a location corresponding with the surface of the reference object.

In some embodiments, generating the offset surfaces includes generating a set of tessellated surfaces forming a point cloud, where each of the tessellated surfaces corresponds with a surface of the reference object, and where each tessellated surface is offset form the corresponding surface of the reference object by an offset distance.

In some embodiments, a first tessellated surface is adjacent a second tessellated surface, and the first and second tessellated surfaces are separated by a gap, and where generating the offset object includes adding a plurality of points to the point cloud, where the added points are added in the gap such that the first and second tessellated surfaces are substantially connected by the added points.

In some embodiments, a first tessellated surface is adjacent a second tessellated surface, and the first and second tessellated surfaces intersect along an intersection curve, and where generating the offset object includes removing a plurality of points of the first and second tessellated surfaces from the point cloud, whereby the remaining portions of the first and second tessellated surfaces terminate at the intersection curve.

In some embodiments, a first tessellated surface is adjacent a second tessellated surface, and where portions of the first and second tessellated surfaces are closer than the minimum thickness limit, and where generating the offset object includes removing a plurality of points of the first and second tessellated surfaces from the point cloud, whereby all remaining points of the first tessellated surface are farther from the remaining points of the second tessellated surface than the minimum thickness limit, and whereby all remaining points of the second tessellated surface are farther from the remaining points of the first tessellated surface than the minimum thickness limit.

In some embodiments, removing the plurality of points from the first and second tessellated surfaces generates a point cloud hole in the point cloud, and where the method further includes generating a mesh from the point cloud, where the mesh includes a mesh hole corresponding with the point cloud hole, and adding points to the mesh to fill in the mesh hole.

In some embodiments, generating the offset object further includes smoothing the mesh.

In some embodiments, generating the offset object further includes generating a polygonal data representation predominantly formed by quadrilaterals based on the smoothed mesh.

In some embodiments, generating the offset object further includes moving a plurality of vertices of the polygonal data representation so that the moved vertices are spaced apart from the reference surface by substantially the offset distance.

In some embodiments, generating the offset object further includes generating a BREP based on the polygon.

In some embodiments, generating the offset object further includes generating a mesh from the point cloud, and smoothing the mesh.

In some embodiments, generating the offset object further includes generating a polygonal data representation predominantly formed by quadrilaterals based on the smoothed mesh.

In some embodiments, generating the offset object further includes moving a plurality of vertices of the polygonal data representation so that the moved vertices are spaced apart from the reference surface by substantially the offset distance.

In some embodiments, generating the offset object further includes generating a BREP based on the polygon.

Another inventive aspect is a method of producing data representing a modified object based on data representing a reference object. The method includes accessing the data representing the reference object with a computer, receiving an indication from a user to generate the modified object, and, in response to the indication, generating a set of one or more offset surfaces based on the data representing the object, where the one or more offset surfaces are offset from surfaces of the reference object, and where the set of one or more offset surfaces defines an open surface, generating an offset object, where generating the offset object includes at least one of adding and removing one or more portions of at least one of the offset surfaces, where, at least partly because of the at least one of adding and removing of the one or more portions, the offset object does not define an open surface, and generating the data representing the modified object, where generating the data representing the modified object includes performing a subtraction operation on the reference object and the offset object.

Another inventive aspect is a method of producing data representing a modified object based on data representing a reference object. The method includes accessing the data representing the reference object with a computer, receiving an indication from a user to generate the modified object, and, in response to the indication, generating a set of one or more offset surfaces based on the data representing the object, where the one or more offset surfaces are offset from surfaces of the reference object, and where the set of one or more offset surfaces defines a region having a surface to surface distance which is than a minimum thickness limit, generating an offset object, where generating the offset object includes at least one of adding and removing one or more portions of at least one of the offset surfaces, where, at least partly because of the at least one of adding and removing of the one or more portions, the offset object does not have a region thinner than the minimum thickness limit, and generating the data representing the modified object, where generating the data representing the modified object includes performing a subtraction operation on the reference object and the offset object.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1:
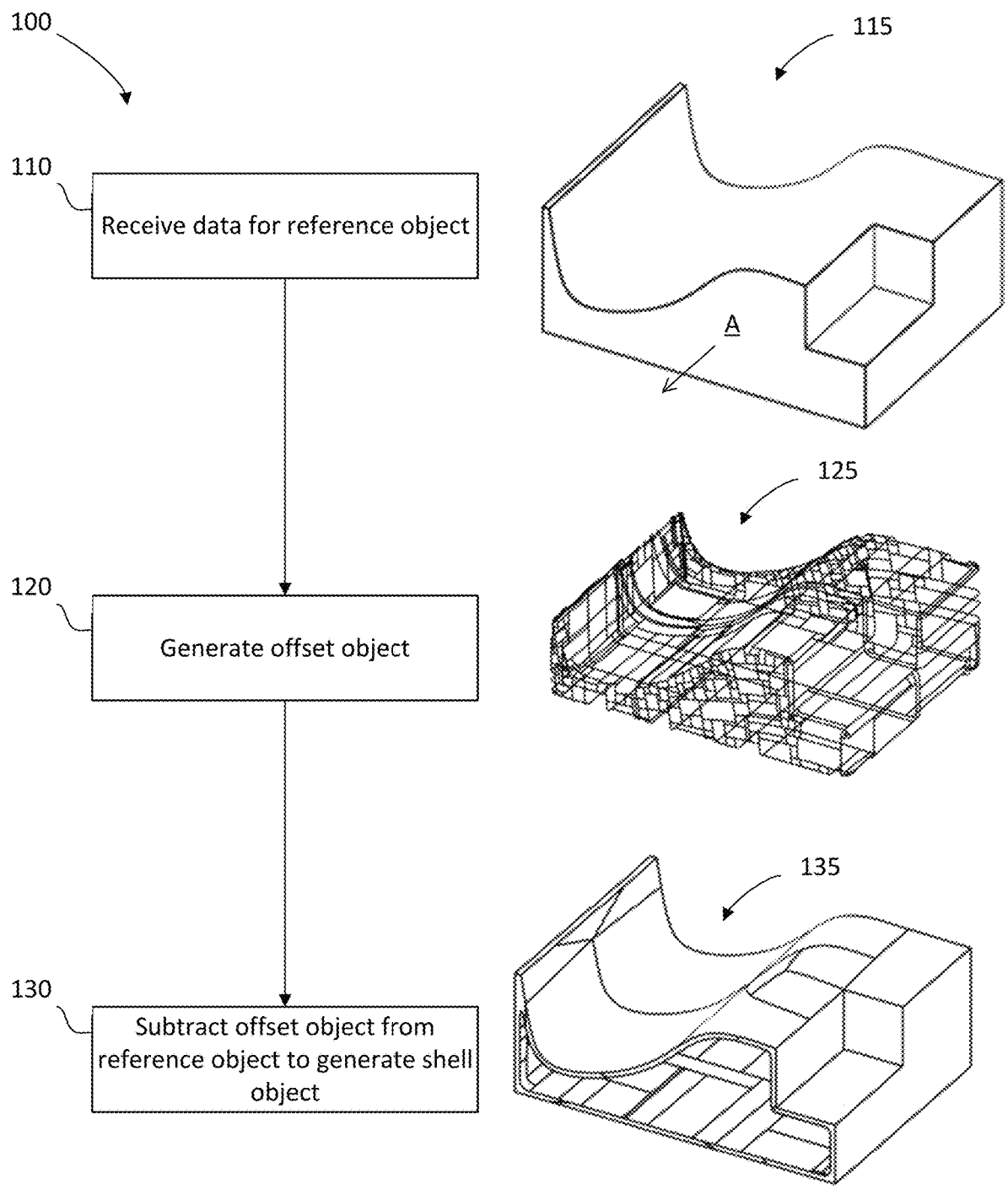
FIG. 1 illustrates a flowchart diagram of a method of shelling or hollowing an object and illustrates schematic diagrams of a reference object, an offset object, and a shelled object according to some embodiments.

FIG. 1 illustrates a flowchart diagram of a method 100 of shelling a reference object 115, and illustrates schematic diagrams of the reference object 115, an offset object 125, and a shelled object 135 according to some embodiments. Method 100 may, for example, be performed by a computer system in response to receiving an indication from a user to generate a thickened object. The indication, may for example, be received by the system from a user interface by which the user interacts with the system. In some embodiments, one or more particular actions of method 100 are performed by a corresponding separate indication from the user to perform the one or more particular actions. Method 100 and the objects illustrated in FIG. 1 are to be understood as example embodiments.

At 110, a system accesses data representing reference object 115. The accessed data may be a polygonal data or other representation of reference object 115. In some embodiments, the accessed data includes a non-uniform rational basis line (NURBS) representation of the reference object 115. In some embodiments, reference object 115 defines a closed surface. In some embodiments, reference object 115 defines an open surface.

At 120, the system generates data representing an offset object 125 based on the accessed data representing reference object 115. The generated data may be a polygonal data or other representation of offset object 125. In some embodiments, the generated data includes a non-uniform rational basis line (NURBS) representation of the offset object 125.

Offset object 125 has topology which is similar to reference object 115. However, offset object 125 is smaller than reference object 115 and is positionable relative to reference object 115 such that most of the outer surfaces of offset object 125 are generally spaced apart from the corresponding outer surfaces of reference object 115 by a substantially constant offset distance.

In the illustrated embodiment, the surfaces of offset object 125 corresponding with surface A of reference object 115 are outside of reference object 115, and are offset from surface A by a distance.

At 130, the system generates data representing a shelled object 135, which is a shelled version of the reference object 115. The shelled object 135 is generated by subtracting the offset object 125 from the reference object 115. The generated data may be a polygonal data or other representation of shelled object 135. In some embodiments, the generated data includes a non-uniform rational basis line (NURBS) representation of the shelled object 135.

As illustrated, shelled object 135 has outer surfaces corresponding with the outer surfaces of reference object 115 other than surface A. In addition, shelled object 135 has an opening in a position corresponding with surface A of reference object 115. Furthermore, shelled object 135 has a void corresponding with the offset object 125. Accordingly, shelled object 135 is a shelled version of reference object 115, having outer surface topologies similar or identical to reference object 115, and having substantially uniform thickness.

A more detailed method of forming a shelled object is described with reference to FIGS. 3A-3C.

Figure 2:
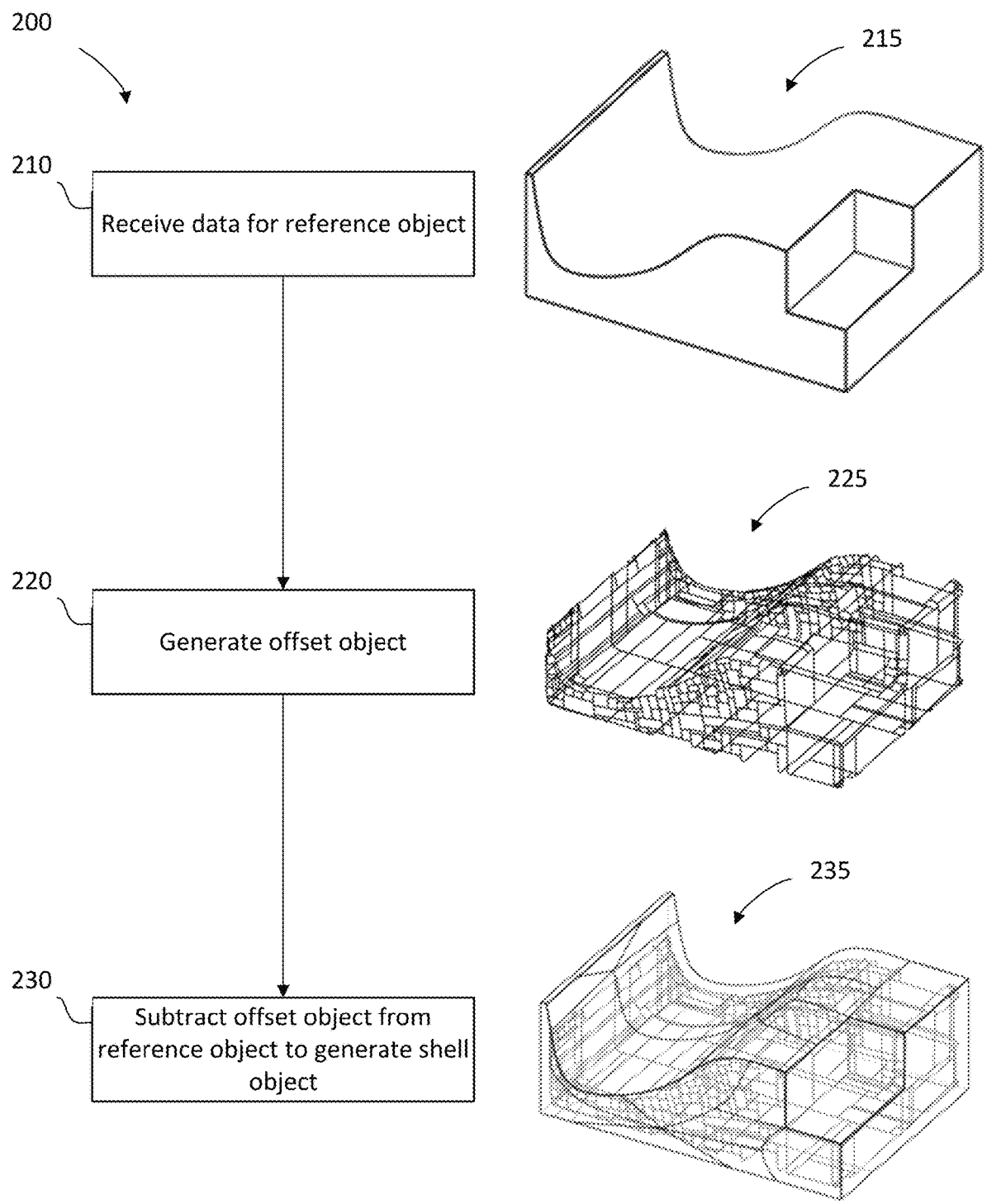
FIG. 2 illustrates a flowchart diagram of a method of hollowing an object and illustrates schematic diagrams of a reference object, an offset object, and a hollow object according to some embodiments.

FIG. 2 illustrates a flowchart diagram of a method 200 of hollowing a reference object 215, and illustrates schematic diagrams of the reference object 215, an offset object 225, and a hollow object 235 according to some embodiments. Method 200 may, for example, be performed by a computer system in response to receiving an indication from a user to generate a thickened object. The indication, may for example, be received by the system from a user interface by which the user interacts with the system. In some embodiments, one or more particular actions of method 200 are performed by a corresponding separate indication from the user to perform the one or more particular actions. Method 200 and the objects illustrated in FIG. 2 are to be understood as example embodiments.

At 210, a system accesses data representing reference object 215. The accessed data may be a polygonal data or other representation of reference object 215. In some embodiments, the accessed data includes a non-uniform rational basis line (NURBS) representation of the reference object 215. In some embodiments, reference object 215 defines a closed surface. In some embodiments, reference object 215 defines an open surface.

At 220, the system generates data representing an offset object 225 based on the accessed data or other representing reference object 215. The generated data may be a polygonal data representation of offset object 225. In some embodiments, the generated data includes a non-uniform rational basis line (NURBS) representation of the offset object 225.

Offset object 225 has topology which is similar to reference object 215. However, offset object 225 is smaller than reference object 215 and is positioned relative to reference object 215 such that the outer surfaces of offset object 225 are generally spaced apart from the corresponding outer surfaces of reference object 215 by a substantially constant offset distance.

At 230, the system generates data representing a hollow object 235, which is a hollow version of the reference object 215. The hollow object 235 is generated by subtracting the offset object 225 from the reference object 215. The generated data may be a polygonal data or other representation of hollow object 235. In some embodiments, the generated data includes a non-uniform rational basis line (NURBS) representation of the hollow object 235.

As illustrated, hollow object 235 has outer surfaces corresponding with the outer surfaces of reference object 215. In addition, hollow object 235 has a void corresponding with the offset object 225. Accordingly, hollow object 235 is a hollow version of reference object 215, having outer surface topologies similar or identical to reference object 215, and having an internal void.

A more detailed method of forming a hollow object is described with reference to FIGS. 3A-3C.

Figure 3A:
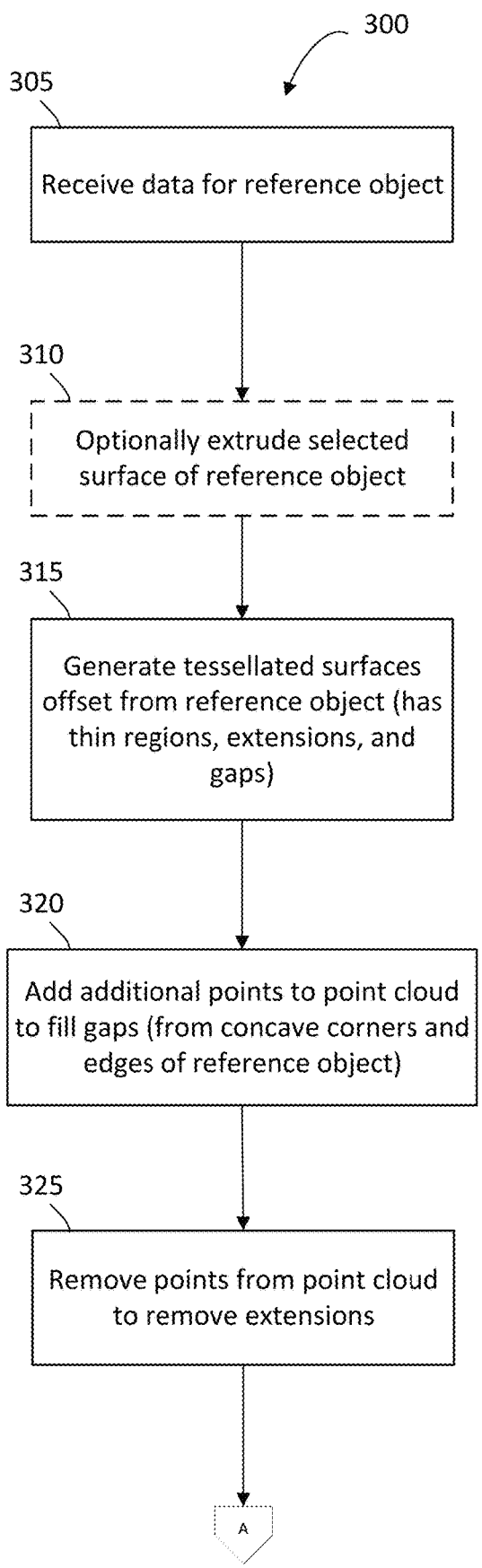
FIG. 3A-3C illustrate a flowchart diagram of a method of shelling or hollowing an object and illustrate schematic diagrams of a reference object, a number of intermediate objects, a shelled object and hollow object according to some embodiments.
Figure 3A:
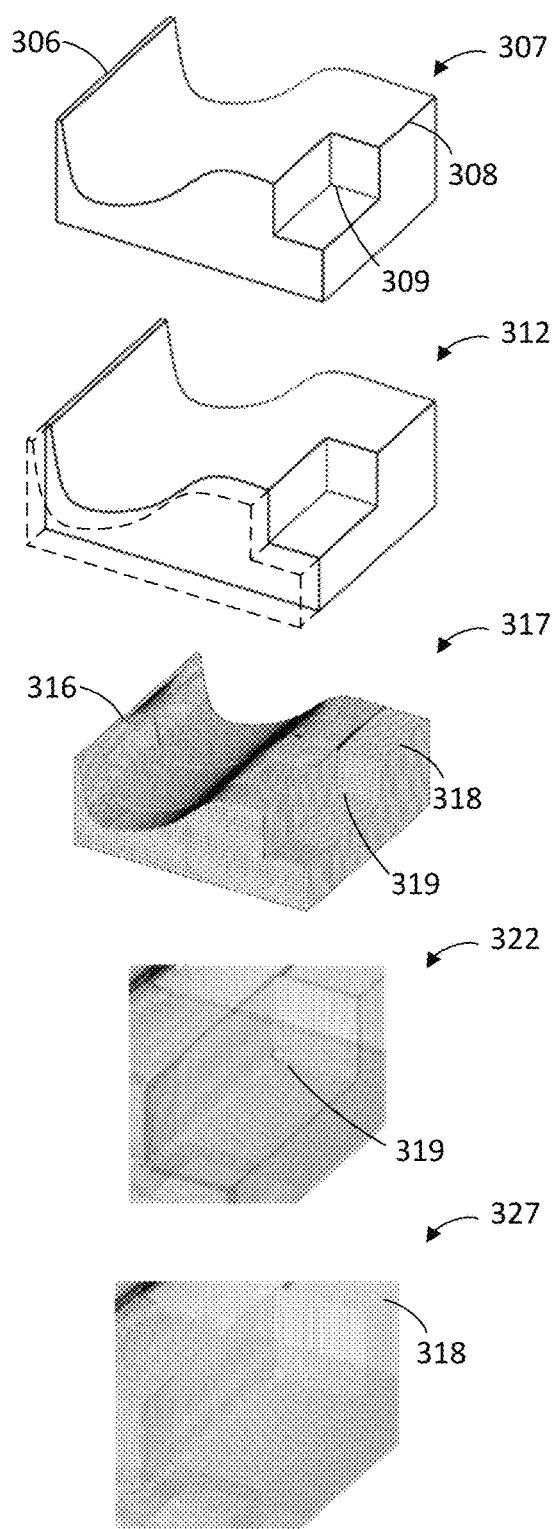
Figure 3B:
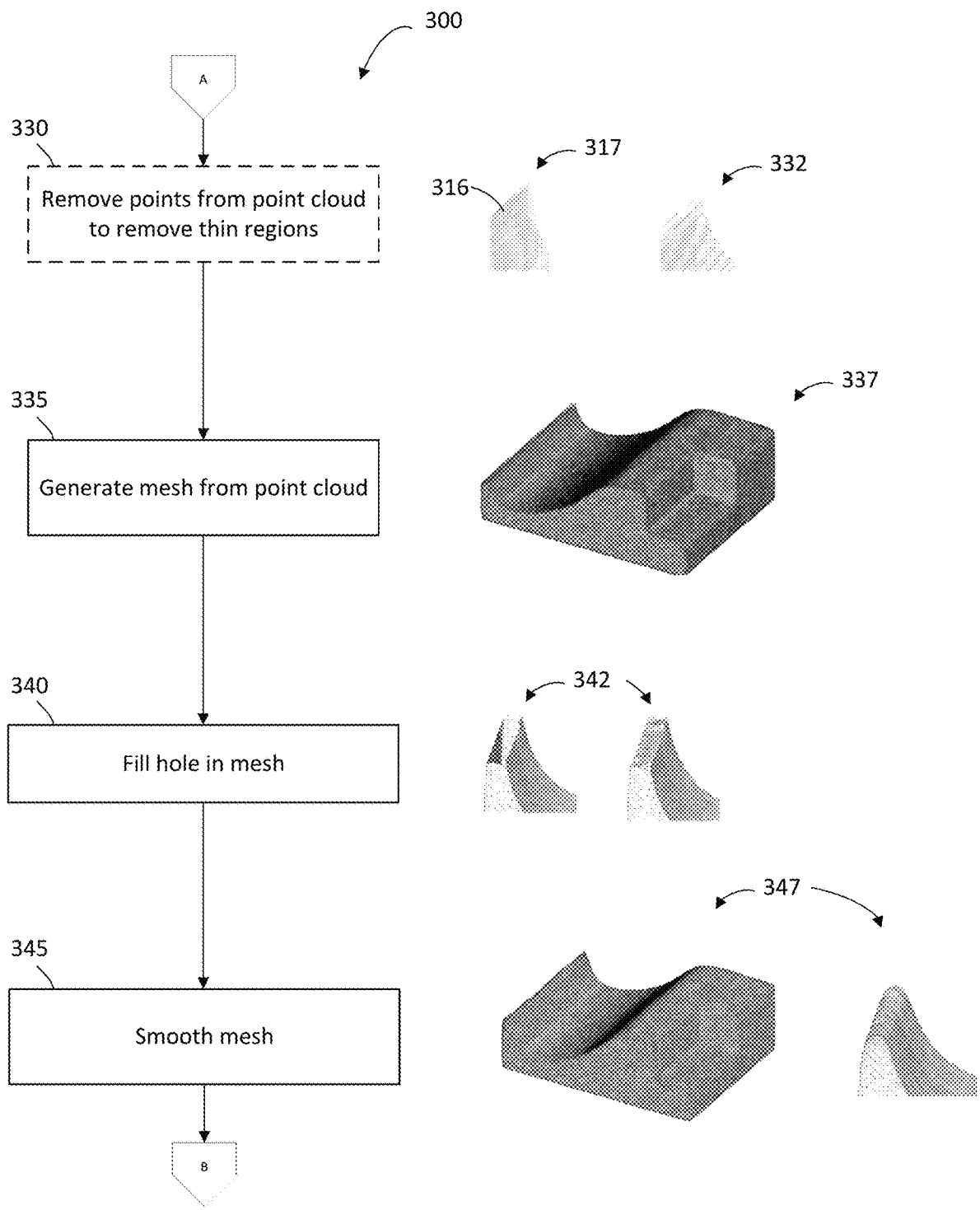
Figure 3C:
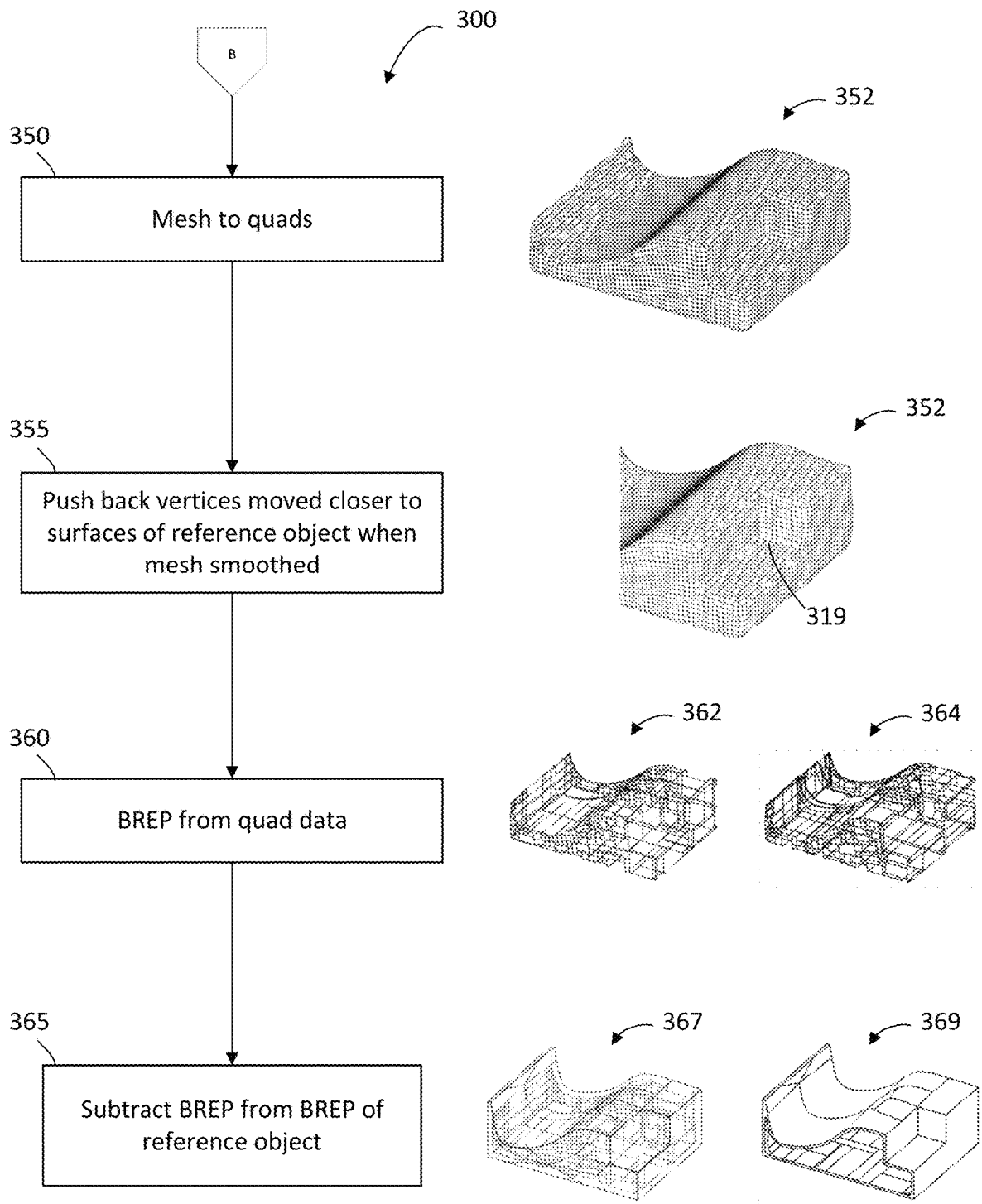

FIG. 3A-3C illustrate a flowchart diagram of a method 300 of shelling or hollowing a reference object 307 and illustrate schematic diagrams of the reference object 307, a number of intermediate objects, a shelled object 369, and a hollow object 367, according to some embodiments. Method 300 may, for example, be performed by a computer system in response to receiving an indication from a user to generate a thickened object. The indication, may for example, be received by the system from a user interface by which the user interacts with the system. In some embodiments, one or more particular actions of method 300 are performed by a corresponding separate indication from the user to perform the one or more particular actions. Method 300 and the objects illustrated in FIGS. 3A-3C are to be understood as example embodiments.

At 305, a system accesses data representing reference object 307. The accessed data may be a polygonal data or other representation of reference object 307. In some embodiments, the accessed data includes a non-uniform rational basis line (NURBS) representation of the reference object 307. In some embodiments, reference object 307 defines a closed surface. In some embodiments, reference object 307 defines an open surface.

At 310, if the method 300 is being used to generate a shelled version of reference object 307, the system generates data representing the reference object 307 having at least one surface extruded, as a modified reference object 312. Which surface or surfaces are to be extruded may be determined based on an input from a user indicating, for example, one or more surfaces to be extruded and distances by which the surfaces are to be extruded.

In some embodiments, at 310, one or more other surfaces, edges, or vertices are modified according to one or more inputs from a user. For example, one or more other surfaces, edges, or vertices may be modified to change the topology of modified reference object 312. For example, a user may prefer that a particular portion of the shelled or hollowed object be thinner or thicker than other portions of the shelled or hold object, and this may be accomplished by modifying one or more other surfaces, edges, or vertices.

At 315, the system generates a tessellated offset surface for each of the surfaces of the reference object 307 or modified reference object 312 to generate tessellated offset surfaces 317. Each tessellated offset surface 317 is generated an offset distance away from a corresponding surface of the reference object 307 or modified reference object 312.

In the illustrated embodiment, tessellated offset surfaces 317 are generated so as to be a same offset distance from corresponding surfaces of reference object 307 or modified reference object 312. In alternative embodiments, one or more tessellated offset surfaces 317 are respectively generated so as to be one or more different offset distances from the corresponding surfaces of reference object 307 or modified reference object 312, according to, for example, one or more inputs from a user indicating the different offset distance for each of the tessellated offset surfaces 317 to be offset a different distance.

In the illustrated embodiments, tessellated offset surfaces 317 are offset from the corresponding surface of reference object 307 or modified reference object 312 in an internal offset direction, where the internal offset direction is perpendicular or substantially perpendicular from the surfaces of the reference object 307 or modified reference object 312 into the reference object 307 or modified reference object 312.

In some embodiments, each tessellated offset surface 317 is generated based on a corresponding reference surface of reference object 307 or modified reference object 312 using a process which includes the system:

A) Generating a tessellated version of the reference surface, where the points of the tessellated offset surface are spaced apart by a distance no greater than a first minimum distance, and where, in regions having certain topological features (discussed below), the points of the tessellated offset surface are spaced apart by a distance no greater than one or more second minimum distances, where the second minimum distances are less than the first minimum distance. In some embodiments, in regions having other topological features (discussed below), the points of the tessellated offset surface are spaced apart by the distance no greater than one or more third minimum distances, where the third minimum distances are greater than the first minimum distance.

B) Generating a tessellated offset surface by perpendicularly projecting the points of the tessellated offset surface by the offset distance for the reference surface in the internal offset direction. The points of the generated tessellated offset surface are spaced apart by a distance substantially no greater than a target maximum distance. In some embodiments, the points of the generated tessellated offset surface are spaced apart by a distance substantially no less than the target minimum distance.

As understood by those of skill in the art, perpendicular projection of points from the reference surface in convex regions (from the perspective of the tessellated offset surface) results in decreased point density in the tessellated offset surface. Accordingly, at A), regions of the reference surface having convex topology are tessellated with points spaced apart so that, when projected at B) to create the tessellated offset surface, the points of the generated tessellated offset surface are spaced apart by a distance substantially no greater than the target maximum distance.

Similarly, as understood by those of skill in the art, perpendicular projection of points from the reference surface in concave regions (from the perspective of the tessellated offset surface) may result in increased point density in the tessellated offset surface. Accordingly, in some embodiments, at A), regions of the reference surface having concave topology are tessellated with points spaced apart so that, when projected at B) to create the tessellated offset surface, the points of the generated tessellated offset surface are spaced apart by a distance substantially no less than the target minimum distance.

In some embodiments, the tessellated offset surfaces 317 are generated based on a corresponding reference surface of reference object 307 or modified reference object 312 using a different process. The tessellated offset surfaces 317 collectively form problematic topological features, which are managed in subsequent actions of method 300, for example, as discussed below.

For some reference objects, the problematic features would cause a theoretical object formed simply by combining the tessellated offset surfaces 317 to violate topological constraint limits. For example, the theoretical object may have portions which violate a minimum thickness limit requirement, a maximum curvature limit, a self-intersection condition requirement, a maximum gap distance requirement between offset surface boundaries, a disappearing surface requirement (for example, a surface inwardly offset from a cylinder of radius 5 units by an offset of 5 units or more), and/or another topological limit. In some embodiments, the topological limits are based manufacturability requirements. For example, some topologies may be formed which are too thin or too sharp for manufacturing.

For some reference objects, the problematic features would cause a theoretical object formed by combining the tessellated offset surfaces 317 to have features which would make forming a BREP based on the theoretical object impossible at least because a theoretical object formed by combining the tessellated offset surfaces 317 would, at least in part, define an open surface or would, at least in part, define a boundary of a shape which is not a solid enclosing a three dimensional volume. For some reference objects, the problematic features would cause a theoretical object formed by combining the tessellated offset surfaces 217 to define a solid which is at least one of not manufacturable, not aesthetically pleasing, and does not function properly.

For example, in region 318 of tessellated offset surfaces 317, which corresponds with region 308 of the reference object 307, because of the topology of the reference object 307 in region 308, the tessellated offset surfaces 317 form an area having problematic extensions. This occurs because the two tessellated offset surfaces 317 at region 318 intersect one another at an intersection curve, and each of the two tessellated offset surfaces at region 318 forms an extension which extends through the intersection curve.

Additionally, in the illustrated embodiment, in region 316 of tessellated offset surfaces 317, which corresponds with region 306 of the reference object 307, because of the topology of the reference object 307 in region 306, the tessellated offset surfaces 317 form a feature having a problematic thickness which is less than a minimum thickness limit. This occurs because the surfaces in region 306 form a thin portion of the reference object 307, and the corresponding tessellated offset surfaces 317 form the thin feature at region 316 which is thinner than a minimum thickness limit. The surfaces in region 306 also form problematic extensions.

Furthermore, in the illustrated embodiment, in region 319 of tessellated offset surfaces 317, which corresponds with region 309 of the reference object 307, because of the topology of the reference object 307 in region 309, the tessellated offset surfaces 317 form an area having a problematic gap. This occurs because, while the surfaces of reference object 307 at region 309 are connected by edges, as a consequence of perpendicularly offsetting the tessellated offset surfaces 317 from the reference object through a perpendicular projection process, the tessellated offset surfaces 317 at region 319 have gaps therebetween.

At 320, the system fills gaps between adjacent tessellated offset surfaces 317, for example, as shown in region 319 of modified tessellated offset surfaces 322. For example, gaps may occur between adjacent tessellated offset surfaces 317 which correspond with surfaces of the reference object 307 or modified reference object 312 which collectively form a concave feature in the reference object 307 or modified reference object 312, such as region 309 of reference object 307. As shown, adjacent surfaces in the region 309 share a common edge, and more than two (in this case three) surfaces share a common vertex, and the topological feature formed by the surfaces is concave.

To fill a gap between two adjacent tessellated offset surfaces 317 corresponding with two surfaces of the reference object 307 or modified reference object 312 sharing an edge, the system may add a tessellated quarter tube to the tessellated offset surfaces 317. The points of the tessellated quarter tube may be spaced apart by a distance substantially no greater than the target maximum distance. In some embodiments, the points of the tessellated quarter tube are spaced apart by a distance substantially no less than the target minimum distance. The tessellated quarter tube may extend along a curve having a location corresponding with the shared edge. At each location along the curve, the tessellated quarter tube may have a cross-sectional shape which is tangent to both of the two adjacent tessellated offset surfaces 317. For example, the quarter tube may have a quarter circular cross-sectional shape having a radius equal to the offset distance for the two adjacent tessellated offset surfaces 317. In some embodiments, the quarter tube has a quarter elliptical cross-sectional shape having a semi-minor axis equal to the offset distance of one of the two adjacent tessellated offset surfaces 317 and having a semi-major axis equal to the offset distance of the other of the two adjacent tessellated offset surfaces 317. In some embodiments, other cross-sectional shapes may be used. In some embodiments, other methods of filling gaps between two adjacent tessellated offset surfaces 317 corresponding with two surfaces of the reference object 307 or modified reference object 312 sharing an edge are used.

To fill a gap created at regions corresponding with a vertex shared by three or more surfaces of the reference object 307 or modified reference object 312, the system may add a tessellated partial ellipsoid to the tessellated offset surfaces 317. The points of the tessellated partial ellipsoid may be spaced apart by a distance substantially no greater than the target maximum distance. In some embodiments, the points of the tessellated partial ellipsoid are spaced apart by a distance substantially no less than the target minimum distance. The tessellated partial ellipsoid may be centered at a location corresponding with the shared vertex. The tessellated partial ellipsoid may have a cross-sectional shapes which are tangent to the tessellated quarter tubes added along the curves terminating at the center of the tessellated partial ellipsoid. For example, the tessellated partial ellipsoid may have a partial spherical shape having a radius equal to the offset distance for the all of tessellated offset surfaces 317 sharing the shared vertex. In some embodiments, the partial ellipsoid has semi-axes equal to the offset distances of the tessellated offset surfaces 317 sharing the shared vertex. In some embodiments, other cross-sectional shapes may be used. In some embodiments, other methods of filling gaps created at regions corresponding with a vertex shared by three or more surfaces of the reference object 307 or modified reference object 312 are used.

At 325, the system removes points of tessellated offset surfaces 317 forming extensions, for example as shown in region 318 of modified tessellated offset surfaces 327. For example, extensions may occur at adjacent tessellated offset surfaces 317 which correspond with surfaces of the reference object 307 or modified reference object 312 which collectively form a convex feature in the reference object 307 or modified reference object 312, such as region 308 of reference object 307. As shown, adjacent pairs of surfaces in the region 308 share a common edge, and the topological feature formed by the surfaces is convex.

To remove the points forming extensions, the system may measure a distance between each point of the tessellated offset surfaces 317 and point at a location corresponding with a nearest point of a nearest surface of the reference object 307 or modified reference object 312. In addition, the system may remove any points having distances which are less than the offset distance of the nearest surface. The system may also remove any points which are at locations corresponding with areas outside the volume of the reference object 307 or modified reference object 312. In some embodiments, other methods of removing extensions of tessellated offset surfaces 317 which, for example, correspond with surfaces of the reference object 307 or modified reference object 312 which collectively form a convex feature in the reference object 307 or modified reference object 312 are used.

At 330, the system removes points of tessellated offset surfaces 317 forming thin regions, as shown in modified tessellated offset surfaces 332. For example, regions thinner than a minimum thickness limit, such as region 316, may occur in the tessellated offset surfaces 317 because the surfaces of the reference object 307 or modified reference object 312 form a thin portion, such as region 306 of reference object 307.

To remove points of tessellated offset surfaces 317 forming regions which are thinner than a minimum thickness limit, the system identifies the points of tessellated offset surfaces 317 which form regions thinner than the minimum thickness limit. The system may identify these points by identifying pairs of points which are characterized such that:

1) The pair of points are not included in a group of points forming a continuous portion of the tessellated offset surfaces 317, where the group of points are closer to one another than the minimum thickness limit or, in some embodiments, are closer to one another than the minimum thickness limit plus or minus a margin, and
2) The pair of points are closer than the minimum thickness limit or are closer than the minimum thickness limit plus or minus a margin.

At 330, the system removes the identified pairs of points. In some embodiments, other methods of identifying and/or removing points of tessellated offset surfaces 317 forming regions which are thinner than a minimum thickness limit are used.

In some embodiments, 330 is not performed. For example, in some embodiments regions thinner than the minimum thickness limit or than the minimum thickness limit plus or minus a margin are removed through a smoothing process, discussed below.

At 335, the system generates a mesh from the modified tessellated offset surfaces 332 or 327. To generate the mesh, the system performs a point cloud to mesh or point cloud to polygonal data conversion process, as understood by those of skill in the art. Any point cloud to mesh or point cloud to polygonal data conversion process may be used.

At 340, the system adds polygons to fill in any holes in the mesh, as illustrated in the before and after images of mesh 337 at region 342. For example, in embodiments where the system removes points of tessellated offset surfaces 317 forming thin regions at optional 330, at 340, the system may add polygons to fill in holes corresponding to regions such as that illustrated in modified tessellated offset surfaces 332. To fill in the holes of the mesh, the system performs a mesh repair process, as understood by those of skill in the art. Any mesh repair process may be used.

At 345, the system performs a smoothing operation on the mesh, as shown in smoothed mesh 347. To smooth the mesh, the system performs a mesh smoothing process or a quad mesh smoothing process, as understood by those of skill in the art. Any mesh smoothing process may be used.

As understood, at least partly because of the removing the points at one or more of 325 and 330, the smoothed mesh does not define an open surface and does not have a region thinner than the minimum thickness limit.

At 350, the system quad wraps the mesh to generate polygonal data 352 formed by quadrilaterals, or formed predominantly by quadrilaterals. To quad wrap the mesh, the system performs a quad wrapping process which generates polygonal data formed by quadrilaterals or formed predominantly by quadrilaterals, as understood by those of skill in the art. Any quad wrapping process may be used.

At 355, the system identifies and moves certain vertices which correspond with points of the modified tessellated surface, which were, at 345, undesirably moved during the smoothing operation. For example, vertices corresponding with points in the concave region 319 may be moved undesirably closer to the reference object 307 or modified reference object 312 by the smoothing operation of 345.

In some embodiments, at 355, the system identifies vertices to move as those mesh vertices corresponding with points of the modified tessellated offset surfaces 332 or 327 which were added at 320. In some embodiments, at 355, the system identifies vertices to move as those vertices which are closer to the reference object 307 or modified reference object 312 than an offset distance. In some embodiments, the system use another method to identify the vertices to be moved.

At 355, the system also moves the identified vertices. In some embodiments, the system moves the identified vertices back to location they would have had without the smoothing operation of 345. In some embodiments, the system moves the identified vertices to a location on a line defined by the position of the unmoved vertices and a nearest point of the reference object 307 or modified reference object 312 at a distance from the reference object or modified reference object which is equal or substantially equal to the offset distance. In some embodiments, the system uses one or more other methods to identify and move identified vertices to a location substantially equal to or farther than the offset distance from the reference object 307 or modified reference object 312.

In some embodiments, the system performs a process similar to the identification and movement of vertices of 355 as part of the mesh smoothing of 345 or after the mesh smoothing of 345. Accordingly, in some embodiments, the polygonal data 352 formed at 350 does not have vertices which are too close to the reference object 307 or modified reference object 312.

At 360, the system performs a polygonal data to BREP (boundary representation) operation on polygonal data 352 to generate offset object 362 (based on reference object 307) or to generate offset object 364 (based on modified reference object 312). To generate offset object 362 or 364, the system performs any polygonal data to BREP process. For example, the system may perform a process having aspect similar or identical to those disclosed in U.S. Pat. No. 8,810,571 or 8,994,724, which are incorporated herein by reference.

Offset object 362 has topology which is similar to reference object 307. However, offset object 362 is smaller than reference object 307, and is positioned relative to reference object 307 such that the outer surfaces of offset object 362 are generally spaced apart from the corresponding outer surfaces of reference object 307 by a substantially constant offset distance.

Similarly, offset object 364 has topology which is similar to reference object 312. However, offset object 364 is smaller than reference object 312, and is positioned relative to reference object 312 such that the outer surfaces of offset object 364 are generally spaced apart from the corresponding outer surfaces of reference object 312 by a substantially constant offset distance.

At 365, the system generates data representing a hollow object 367, which is a hollow version of the reference object 307, or representing a shelled object 369, which is a shelled version of the reference object 307.

A hollow object 367 is generated by subtracting the offset object 362 from the reference object 307. The generated data may be a polygonal data or other representation of hollow object 367. In some embodiments, the generated data includes a non-uniform rational basis line (NURBS) representation of the hollow object 367.

As illustrated, hollow object 367 has outer surfaces corresponding with the outer surfaces of reference object 307. In addition, hollow object 367 has a void corresponding with the offset object 362. Accordingly, hollow object 367 is a hollow version of reference object 307, having outer surface topologies identical to reference object 307, and having an internal void.

A shelled object 369 is generated by subtracting the offset object 364 from the reference object 307. The generated data may be a polygonal data or other representation of shelled object 369. In some embodiments, the generated data includes a non-uniform rational basis line (NURBS) representation of the shelled object 369.

As illustrated, shelled object 369 has outer surfaces corresponding with the outer surfaces of reference object 307. In addition, shelled object 369 has a void corresponding with the offset object 364. In addition, shelled object 369 has an opening corresponding with the surface of reference object 307 identified at 310. Accordingly, shelled object 369 is a shelled version of reference object 307, having outer surface topologies identical to reference object 307, having an internal void, and having an opening.

In the illustrated embodiments, the offset objects are offset from the reference objects by an offset distance in an internal offset direction, where the internal offset direction is perpendicular or substantially perpendicular from the surfaces of the reference object into the reference object. In alternative embodiments, an offset object is generated so as to be offset from the reference object by an offset distance in an external offset direction, where the external offset direction is perpendicular or substantially perpendicular from the surfaces of the reference object away from the reference object. In these alternative embodiments, various aspects of method 300 may be modified to generate and use offset objects having external offset directions while maintaining the other applicable aspects of method 300 according to principles understood by those of skill in the art informed by the principles discussed herein.

For example, at 315, the tessellated offset surfaces 317 may be offset from the corresponding surface of reference object 307 or modified reference object 312 in an external offset direction, where the external offset direction is perpendicular or substantially perpendicular away from the surfaces of the reference object 307 or modified reference object 312.

In some embodiments where the offset object is offset from the reference object in an external offset direction, at 320, gaps may be filled at locations corresponding with convex features of the reference object 307, and, at 325, points forming extensions may be removed at locations corresponding with concave features of reference object 307, as understood by those of skill in the art informed by principles discussed herein.

In some embodiments where the offset object is offset from the reference object in an external offset direction, 345 may be omitted, and the reference object 307 or modified reference object 312 is instead smoothed, as understood by those of skill in the art informed by principles discussed herein, and especially those principles discussed herein with reference to 350 and 355.

In some embodiments where the offset object is offset from the reference object in an external offset direction, at 365, reference object 307 may be subtracted from object 362 to form hollow object or modified reference object 312 may be subtracted from object 362 to form shelled object.

Figure 4:
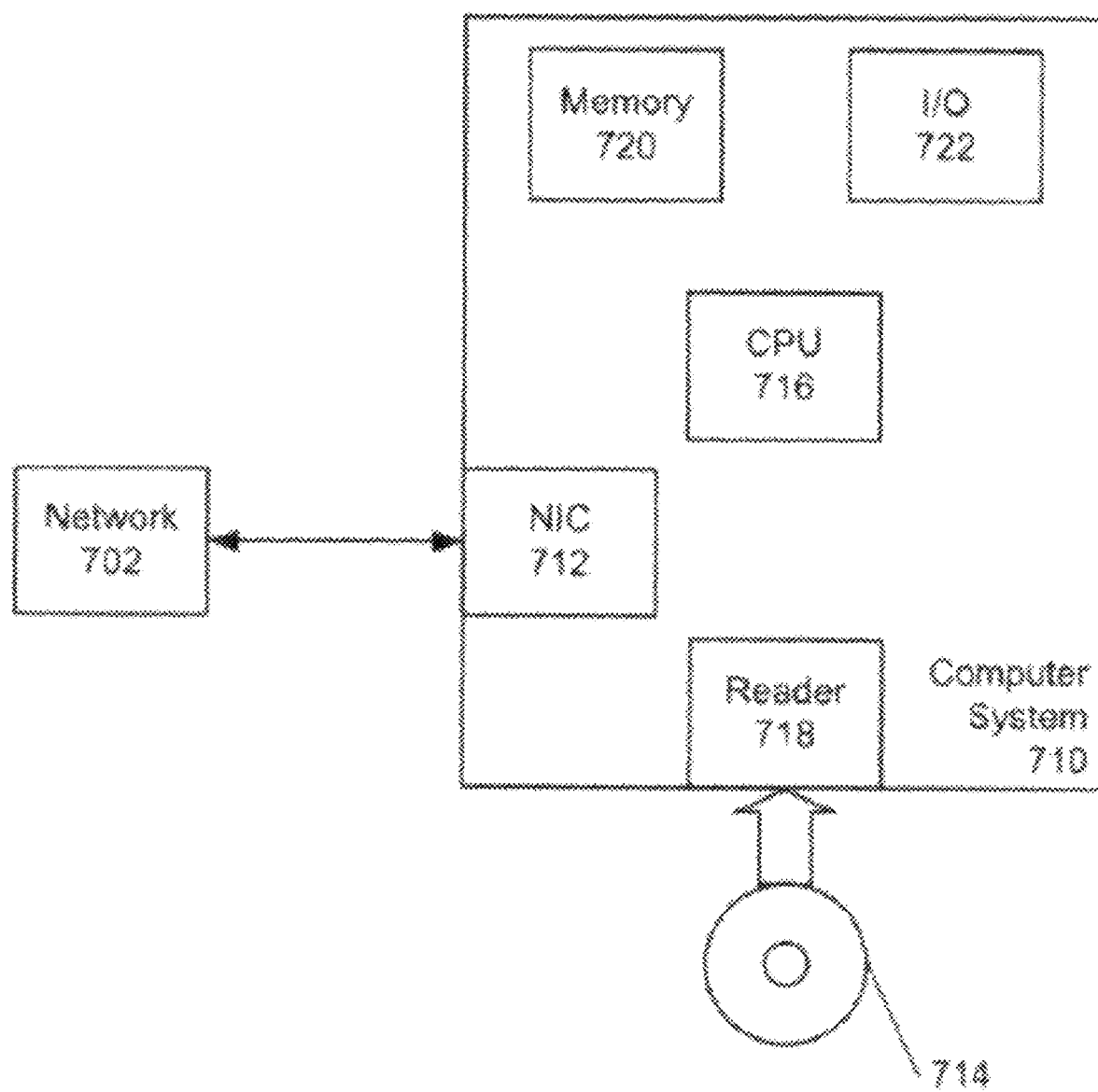
FIG. 4 shows a configuration of a computer system constructed in accordance with the present disclosure.

With reference now to FIG. 4, a configuration for a computer system 710 constructed in accordance with the present disclosure to perform the operations disclosed herein is shown. The computer system 710 can comprise a system such as a personal computer or server computer or the like. The computer system 710 may include a network communication interface 712 that permits communications with a network 702. The network interface can comprise a network interface card (NIC). The computer system 710 can execute instructions to provide a computer system which performs various aspects and principles of the methods and features described herein. For example, each of these may be implemented by one or more of the computer systems 710.

The computer system 710 includes a central processor unit 716 (CPU) and a program product reader 718 for receiving a program product media and reading program instructions recorded thereon, where the instructions, when executed by the computer cause the computer to perform various aspects and principles of the methods and features described herein. The computer system also includes associated memory 720 and input/output facilities 722, such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter executed. That is, the program product 714 is for use in a system such as the computer system 710, wherein the program product comprises a tangible, non-transitory recordable media containing a program of computer-readable instructions that are executable by the device processor 704 to perform the operations described herein. The program product 714 can comprise, for example, optical program media such as CD or DVD data discs, or flash memory drives, or external memory stores, or floppy magnetic disks, and the like.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

The various results of embodiments described herein may be stored in memory 720. Additionally, graphical representations of the various results of the embodiments may be presented using input/output facilities 722.

While the principles of the disclosure have been described above in connection with specific apparatuses and methods, it is to be clearly understood that this description is made only by way of example and not as limitation on the scope of the disclosure.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of producing data representing a modified object based on data representing a reference object, the method comprising:
    accessing the data representing the reference object with a computer;
    receiving an indication from a user to generate the modified object; and
    in response to the indication:
        generating a set of one or more offset surfaces based on the data representing the object, wherein the one or more offset surfaces are offset from surfaces of the reference object, and wherein at least one of:
            A) the set of one or more offset surfaces defines an open surface, and
            B) the set of one or more offset surfaces defines a region having a surface to surface distance which is less than a minimum thickness limit,
        generating an offset object, wherein generating the offset object comprises at least one of adding and removing one or more portions of at least one of the offset surfaces, wherein, at least partly because of the at least one of adding and removing of the one or more portions, the offset object both does not define an open surface and does not have a region thinner than the minimum thickness limit, and
        generating the data representing the modified object, wherein generating the data representing the modified object comprises performing a subtraction operation on the reference object and the offset object,
        wherein generating the offset surfaces comprises generating a set of tessellated surfaces forming a point cloud, wherein each of the tessellated surfaces corresponds with a surface of the reference object, and wherein each tessellated surface is offset form the corresponding surface of the refence object by an offset distance,
    wherein a first tessellated surface is adjacent a second tessellated surface, and wherein portions of the first and second tessellated surfaces are closer than the minimum thickness limit, and wherein generating the offset object comprises:
        removing a plurality of points of the first and second tessellated surfaces from the point cloud, whereby all remaining points of the first tessellated surface are farther from the remaining points of the second tessellated surface than the minimum thickness limit, and whereby all remaining points of the second tessellated surface are farther from the remaining points of the first tessellated surface than the minimum thickness limit.

2. The method of claim 1, wherein the reference object defines a closed surface.

3. The method of claim 1, wherein the modified object is hollow.

4. The method of claim 1, wherein the modified object is represented by a non-uniform rational basis line (NURBS) representation.

5. The method of claim 1, wherein generating the offset object comprises extruding a surface of the reference object.

6. The method of claim 5, wherein the modified object comprises an opening in a location corresponding with the surface of the reference object.

7. The method of claim 1, wherein the first and second tessellated surfaces are separated by a gap, and wherein generating the offset object comprises:
    adding a plurality of points to the point cloud, wherein the added points are added in the gap such that the first and second tessellated surfaces are substantially connected by the added points.

8. The method of claim 1, wherein the first and second tessellated surfaces intersect along an intersection curve, and wherein generating the offset object comprises:
    removing a plurality of points of the first and second tessellated surfaces from the point cloud, whereby the remaining portions of the first and second tessellated surfaces terminate at the intersection curve.

9. The method of claim 1, wherein removing the plurality of points from the first and second tessellated surfaces generates a point cloud hole in the point cloud, and wherein the method further comprises:
    generating a mesh from the point cloud, wherein the mesh comprises a mesh hole corresponding with the point cloud hole; and
    adding points to the mesh to fill in the mesh hole.

10. The method of claim 9, wherein generating the offset object further comprises smoothing the mesh.

11. The method of claim 10, wherein generating the offset object further comprises generating a polygonal data representation predominantly formed by quadrilaterals based on the smoothed mesh.

12. The method of claim 11, wherein generating the offset object further comprises moving a plurality of vertices of the polygonal data representation so that the moved vertices are spaced apart from the reference surface by substantially the offset distance.

13. The method of claim 12, wherein generating the offset object further comprises generating a BREP based on the polygon.

14. The method of claim 1, wherein generating the offset object further comprises:
   generating a mesh from the point cloud; and
   smoothing the mesh.

15. The method of claim 14, wherein generating the offset object further comprises generating a polygonal data representation predominantly formed by quadrilaterals based on the smoothed mesh.

16. A method of producing data representing a modified object based on data representing a reference object, the method comprising:
   accessing the data representing the reference object with a computer;
   receiving an indication from a user to generate the modified object; and
   in response to the indication:
      generating a set of one or more offset surfaces based on the data representing the object, wherein the one or more offset surfaces are offset from surfaces of the reference object, and wherein at least one of:
         A) the set of one or more offset surfaces defines an open surface, and
         B) the set of one or more offset surfaces defines a region having a surface to surface distance which is less than a minimum thickness limit,
      generating an offset object, wherein generating the offset object comprises at least one of adding and removing one or more portions of at least one of the offset surfaces, wherein, at least partly because of the at least one of adding and removing of the one or more portions, the offset object both does not define an open surface and does not have a region thinner than the minimum thickness limit, and
      generating the data representing the modified object, wherein generating the data representing the modified object comprises performing a subtraction operation on the reference object and the offset object,
   wherein generating the offset surfaces comprises:
      generating a set of tessellated surfaces forming a point cloud, wherein each of the tessellated surfaces corresponds with a surface of the reference object, and wherein each tessellated surface is offset form the corresponding surface of the refence object by an offset distance;
      generating a mesh from the point cloud;
      smoothing the mesh;
      generating a polygonal data representation predominantly formed by quadrilaterals based on the smoothed mesh; and
      moving a plurality of vertices of the polygonal data representation so that the moved vertices are spaced apart from the reference surface by substantially the offset distance.

17. The method of claim 16, wherein generating the offset object further comprises generating a BREP based on the polygon.

18. The method of claim 16, wherein the reference object defines a closed surface.

19. The method of claim 16, wherein the modified object is hollow.

20. The method of claim 16, wherein the modified object is represented by a non-uniform rational basis line (NURBS) representation.

21. The method of claim 16, wherein generating the offset object comprises extruding a surface of the reference object, and wherein the modified object comprises an opening in a location corresponding with the surface of the reference object.

* * * * *